(12) United States Patent
Bryant, Jr.

(10) Patent No.: US 8,234,928 B1
(45) Date of Patent: Aug. 7, 2012

(54) ABAYOMI TESTER BODY

(76) Inventor: Abayomi C. Bryant, Jr., Philadelphia, PA (US)

( * ) Notice: Subject to any disclaimer, the term of this patent is extended or adjusted under 35 U.S.C. 154(b) by 400 days.

(21) Appl. No.: 12/455,592

(22) Filed: Aug. 20, 2009

(51) Int. Cl.
*G01L 7/00* (2006.01)
(52) U.S. Cl. .......................................... 73/756; 73/861
(58) Field of Classification Search .................. None
See application file for complete search history.

(56) References Cited

U.S. PATENT DOCUMENTS

| | | | | |
|---|---|---|---|---|
| 4,416,030 | A * | 11/1983 | Reynoso | 4/541.6 |
| 5,183,078 | A * | 2/1993 | Sorrell | 137/883 |
| 5,187,974 | A * | 2/1993 | Mellits et al. | 73/49.7 |
| 5,198,980 | A * | 3/1993 | Patrick | 701/33.2 |
| 5,357,792 | A * | 10/1994 | Getenby | 73/114.43 |
| 6,202,481 | B1 * | 3/2001 | Basore | 73/114.43 |
| 7,125,003 | B1 * | 10/2006 | Falkner | 261/76 |
| 7,784,353 | B1 * | 8/2010 | Feldmeier | 73/744 |
| 2005/0241370 | A1* | 11/2005 | Schmidt | 73/37 |

* cited by examiner

*Primary Examiner* — Lisa Caputo
*Assistant Examiner* — Jermaine Jenkins

(57) ABSTRACT

This invention is a testing device that tests pressure of water, oil or gas and can be used anywhere, at anytime, and with greater accuracy then anything on the market.

4 Claims, 7 Drawing Sheets

Fitting Requirements (2) ½" Square Hex Nipple (2) ½"Reduced to 3/8 Square Hex Nipple (2) 1/8" square Hex Head Plugs Fig. 1 Fitting Requirements (2) ½" Square Hex Nipple (2) ½" Reduced to 3/8 Square Hex Nipple (2) 1/8" square Hex Head Plugs Fig. 2 Fitting Requirements (2) ½ Reduced To 5/16 brushing (2) ½ Reduced To 3/8 Square Hex Head Nipple 27 & 30

(2) 1/8 Square Hex Head Plugs (2) ½ Square Hex Head Plugs

Fig. 3
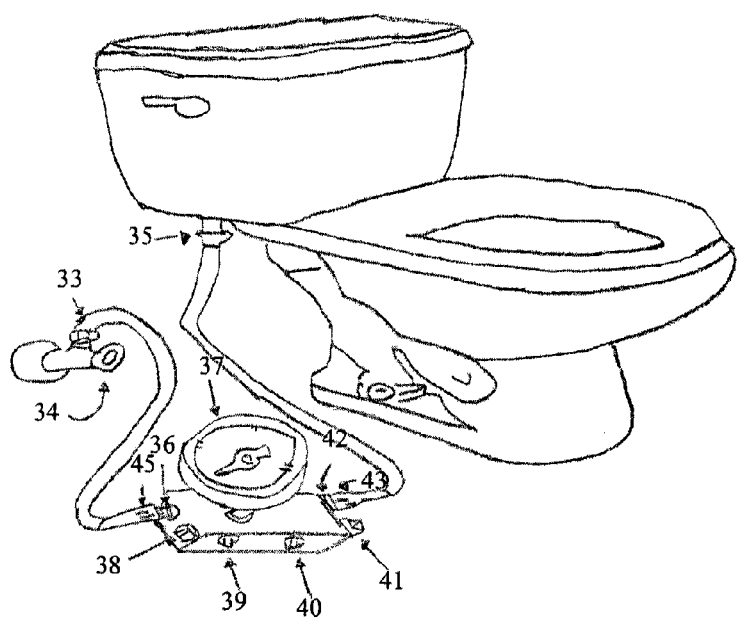
Fig. 3 Fitting Requirements
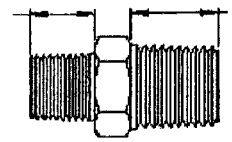
(2) ½ " reduced To 3/8 Square Hex Head Nipple
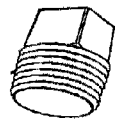
(2) 1/8 " Square Plugs (39 & 40)
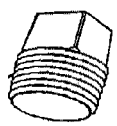
(2) ½ " Square Plugs (38 & 41)
Fig. 4
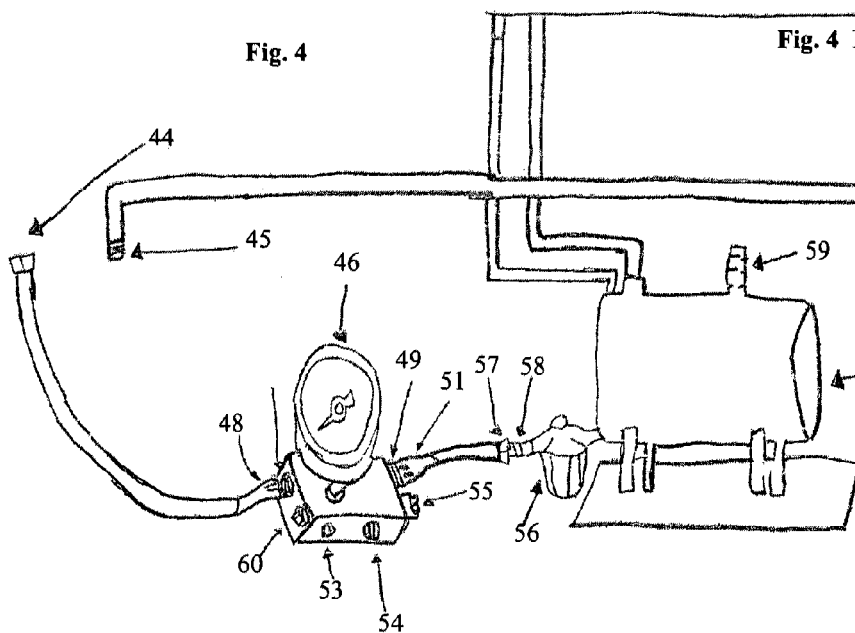
Fig. 4 Fitting Requirements
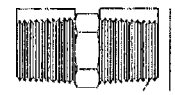
(2) ½ " Hex Head Nipple
(2) 1/8 " Square Plugs (53 & 54)
(2) ½ " Square Plugs (55 & 60)

Fig. 5
Fig. 6
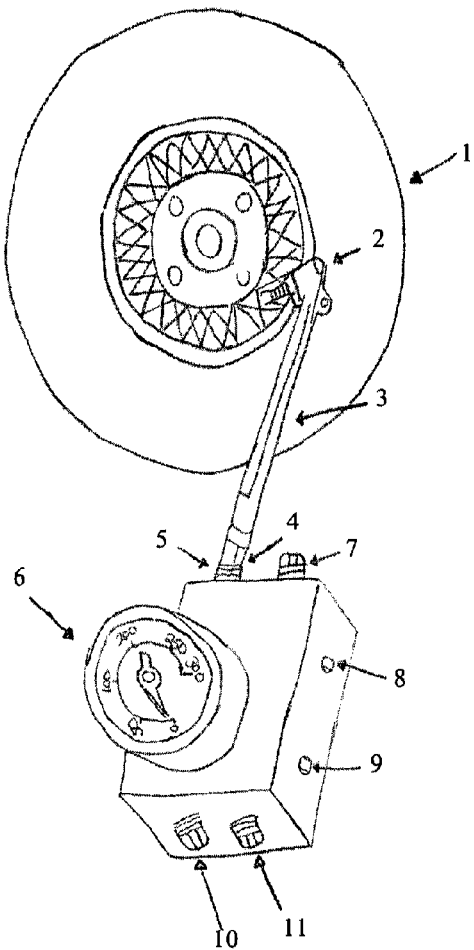
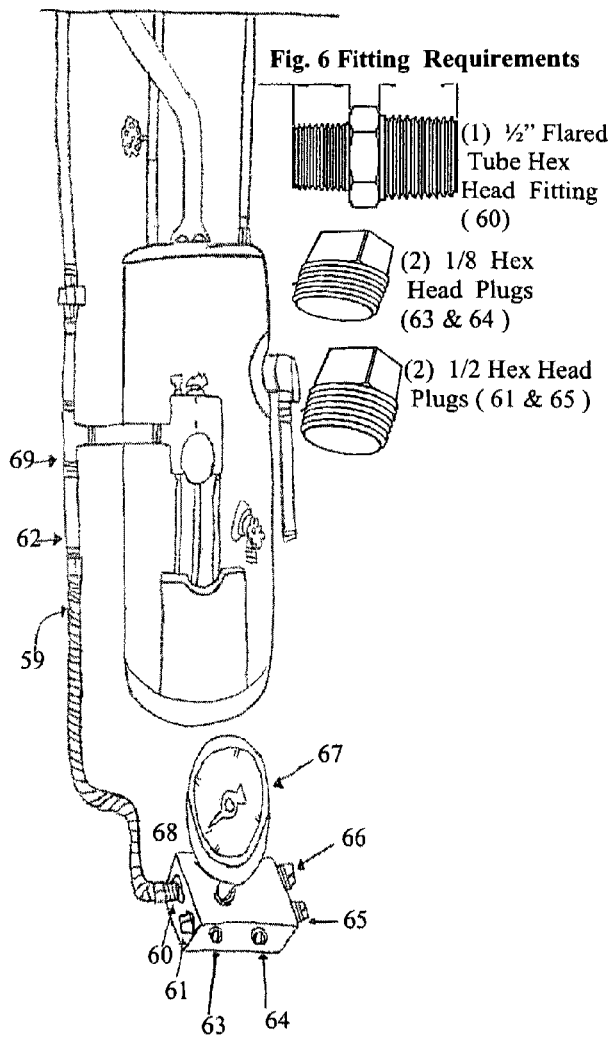
Fig. 6 Fitting Requirements
(1) ½" Flared Tube Hex Head Fitting (60)
(2) 1/8 Hex Head Plugs (63 & 64)
(2) 1/2 Hex Head Plugs (61 & 65)
Fig. 5 Fitting Requirements
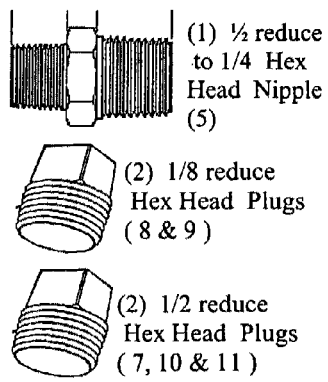
(1) ½ reduce to 1/4 Hex Head Nipple (5)
(2) 1/8 reduce Hex Head Plugs (8 & 9)
(2) 1/2 reduce Hex Head Plugs (7, 10 & 11)

Fig. 7
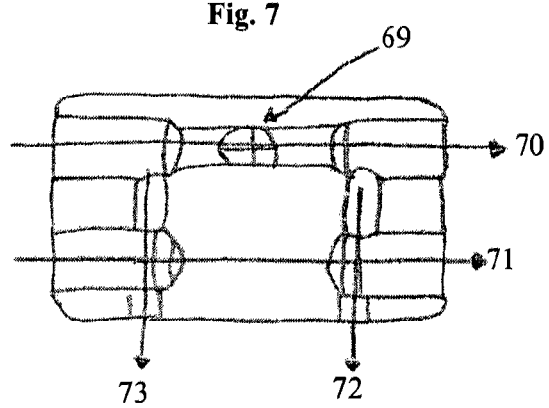
Fig. 11
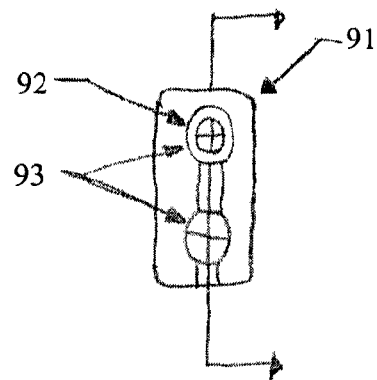
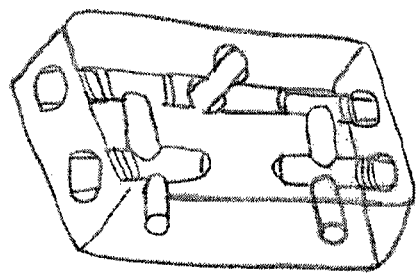
Fig. 9
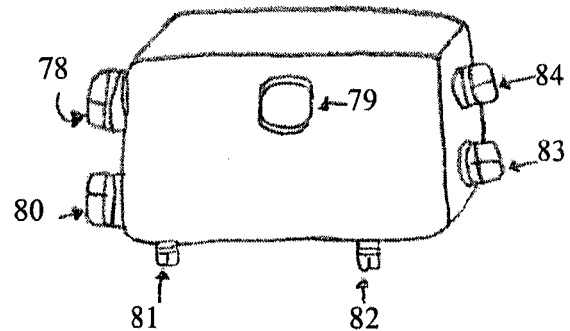
Fig. 12
Fig. 10
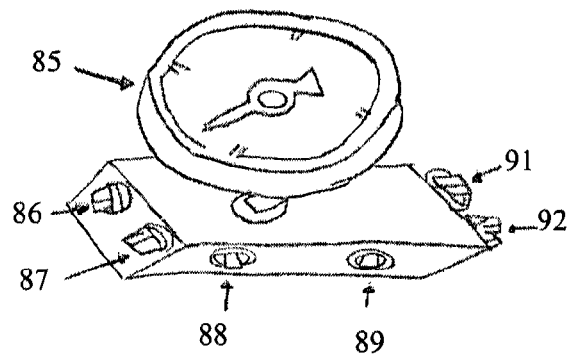

Fig. 13
Fig. 15
Fig. 14
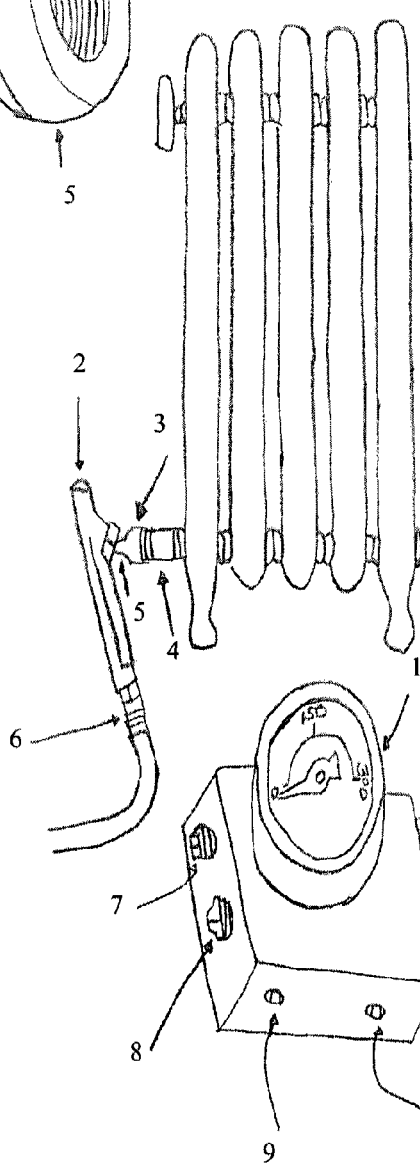
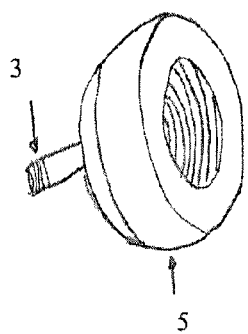
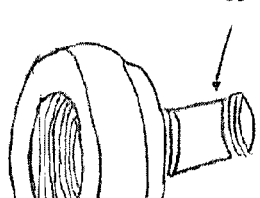
Fig. 14 Fitting Requirements
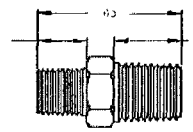
(2) ½ Reduced Hex Nipple
( 6 &13)
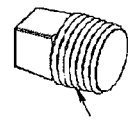
(2) 1/8 Hex Head Plugs
( 09 & 10 )
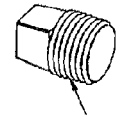
(3) ½ Hex Head Plugs
( 07, 08 & 11 )

ABAYOMI TESTER BODY

CROSS REFERENCE TO THE APPLICATIONS

None known.

STATEMENT REGARDING FEDERALLY SPONSORED RESEARCH OR DEVELOPMENT

None

REFERENCE TO SEQUENCE LISTING, A TABLE OR A COMPUTER PROGRAMMING LISTING COMPACT DISC APPENDIX

None

BACKGROUND OF THE INVENTION

The inventor, Abayomi C. Bryant, Jr., has worked for many years as a field mechanic dealing with machinery and commercial and residential equipment that requires fluid or gas pressure. This includes everything from testing water pressure of a residential sink spigot to high pressure boilers.

The inventor noticed that there was no pressure testing devices available that had multiple function uses or were easy to store and use. Despite the lack of such testing equipment, such pressure testing can be very important to the proper functioning of the machinery or equipment used in the commercial settings.

The inventor, through experimentation and design, has developed a tester a body that can be used with many different types of fittings. The ATB is equipped with four one-half inch threaded openings that are fabricated for numerous types of half inch fittings used in nearly all machinery and utility uses that require fluid or gas pressure.

The economical, time saving, more reliable and convenient the then current methods of testing, which are limited to single uses and/or require professionals such as sweating copper lines.

This tester was developed because of the frustration the inventor felt and saw in the lack of any testing ability where fluids, water or gas pressures are important for proper diagnosis or proper setting or trouble shooting malfunctions.

The ATB will eliminate a common process that over the years became customary to the majority of consumer or plumbers, which was having to swear pipes lines to install brass Ts with a quarter inch bushings on supply lines and then later removing the tester T with the bushing to sweat on a permanent coupling. The ATB can be easily connected to almost any location where there are fluids, liquids, or gases to be tested. It is connected to readily assessable supply lines and, once the ATB is in position, it permits the user to an aggressive approach in scrutinizing water, oil or gas pressure. The ATB can be installed easily to any system that relies on fluids, water or gas running through hardware that is on a pressure system and can be connected to countless hardware.

The ATB is compatible with numerous day to day hardware that people in society depend onto function, whether it is in a commercial or residential setting. They include washer system (commercial or residential), sinks, bathroom faucets, kitchen stoves, hot water heaters, well systems, numerous machines, toilets, boilers, and anything else that functions with fluids water Or gas under pressure. It can be used in the automotive field to measure the volume of pressure coming from oil pans, transmission systems, and fuel pump systems. It can be used for many types of convenience machines of any size where there is a specific amount of pressure necessary to make hot water or cold water for vending machines for tea or coffee, heating of ovens which maintain hot water for heating pads in doctor offices or other uses.

The ATB can used in heating, ventilating and air conditioning systems to permit the heating unit to become more efficient, when it is receiving the proper volume of water, oil or gas pressure to do so. It can also be used for hot water boiler systems, forced air systems or oil heating systems.

The ATB will remove any form of guessing what the accurate water, oil or gas pressure is from any operating system. In the past, not having the right pressure testing unit at hand, which virtually non-existent, would put you in a position where you would not be able to pinpoint where the water, oil or gas pressure has diminished. Any other available pressure examining equipment is not equipped to connect onto supply lines where the ATB can do so quickly and easily.

BRIEF SUMMARY OF THE INVENTION

This should be read with the above, background of the invention.

The ATB provides testing of fluids and gas pressure within a main.

The ATB provides testing of fluids and gas pressure within a main pipeline or supply line and line it does not have to be an all day event. It is highly accurate and is tapped with a quarter inch thread at the center of the ATB block to insure when the gauge is installed properly so that he the measuring device will not be compromised or give false readings.

The ATB is readily assessable will all adapters to connect to areas where they do not have the capacity to do so, which puts the examiner in position to complete the task correctly and properly. In addition to the above, the following claims are hereby made:

The ATB will serve all the needs of commercial and noncommercial uses that require pressure testing for water, any fluids or gas in an easy, quick and accurate manner. It will make also provide data necessary to maintain all types of machines or apparatuses from sinks to large commercial boiler to operate efficiently.

BRIEF DESCRIPTION OF THE SEVERAL VIEWS OF THE DRAWING

FIG. 3—Drawing of tool connected to the toilet.

FIG. 4—Drawing of the tool connected to the Oil Tank.

FIG. 5—Drawing of the tool connected to Tire Stem.

FIG. 6—Drawing of the tool connected to the hot water heater gas line.

FIG. 7—Drawing of the tool showing the tapings.

FIG. 9—Drawing of the tool with plugs screwed into them.

FIG. 10—Drawing of the tool with the gauge and all plugs.

FIG. 11—Drawing of the tool showing a left side view.

FIG. 12—Drawing of the tool showing a right side view.

FIG. 13—Drawing of a special fitting which connect to the left side of a radiator.

FIG. 14—Drawing of the tool connected to the radiator with the two special fittings.

FIG. 15—Drawing of special fitting which connect to the right side of the radiator.

Figure 1:
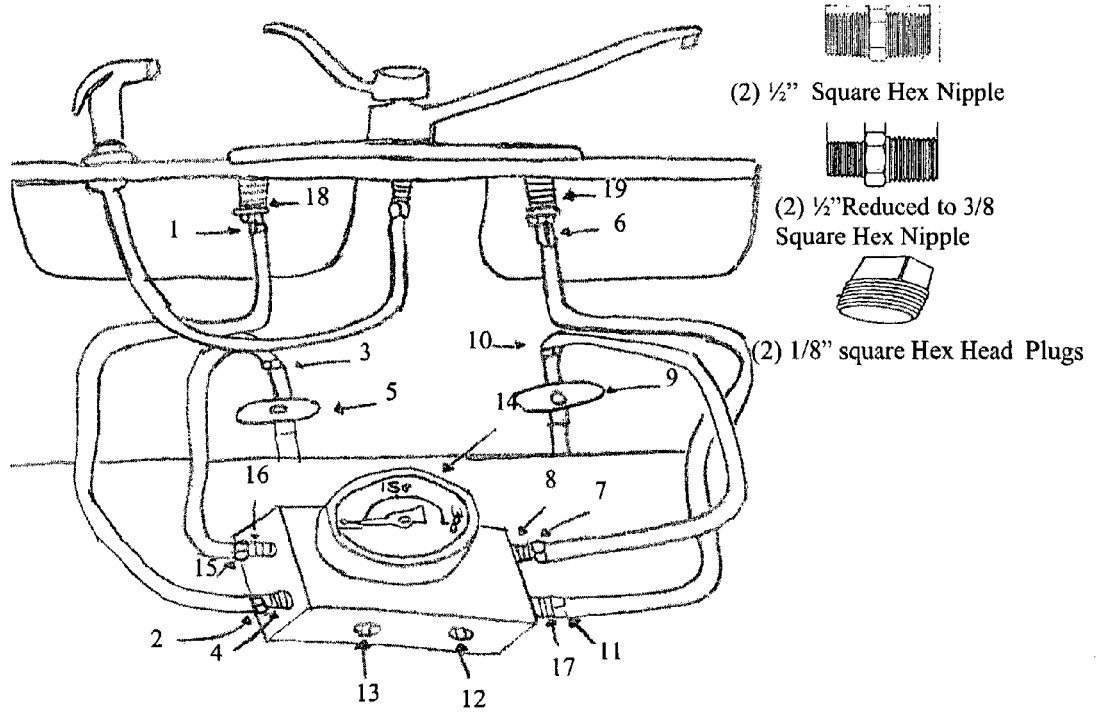
FIG. 1—Drawing of the tool connected underneath the sink.
Figure 2:
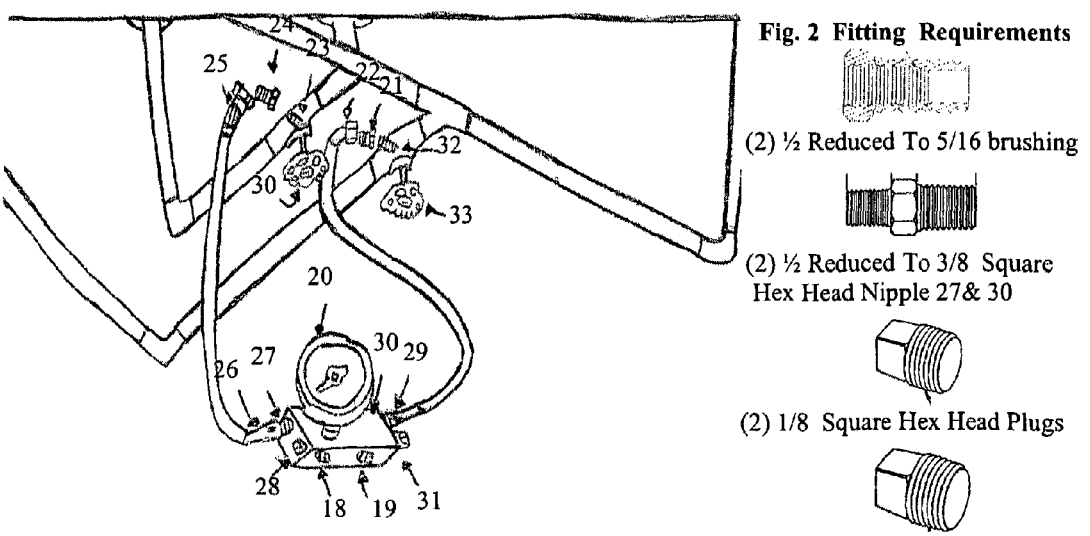
FIG. 2—Drawing of the tool connected to the copper pipe shutoff valve.
Figure 16:
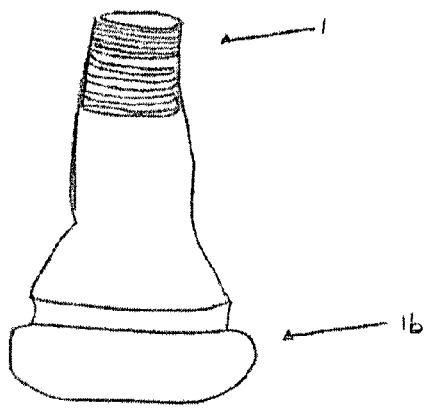
FIG. 16—Drawing of a Tire Stem.
Figure 17:
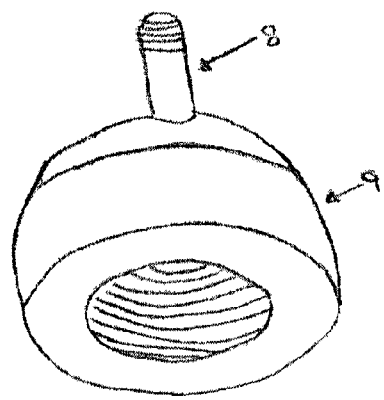
FIG. 17—Drawing of special fittings for the radiator.
Figure 18:
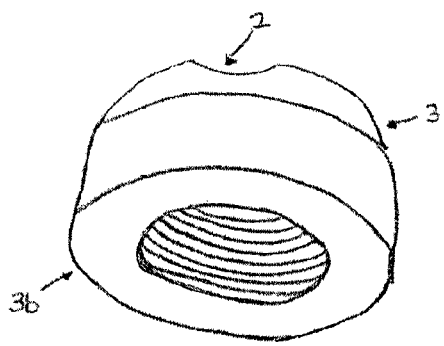
FIG. 18—Drawing of a plug with a drill hole in the center of it.
Figure 19:
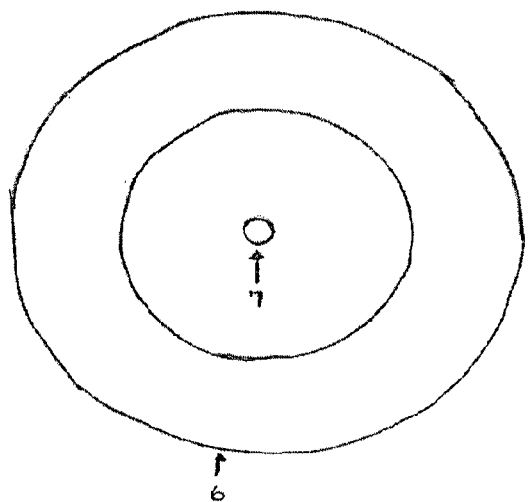
FIG. 19—Drawing of a plug with a drill hole in the center of it.
Figure 20:
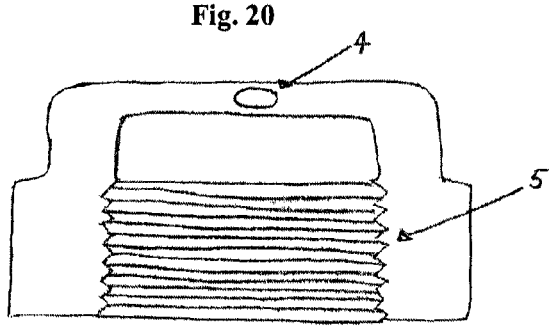
FIG. 20—Drawing a plug with a drill hole in the center of it.
Figure 22:
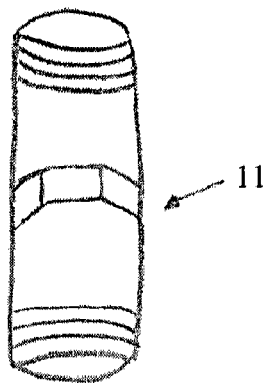
FIG. 22—Drawing of Drawing of Hex Head Coupling.
Figure 23:
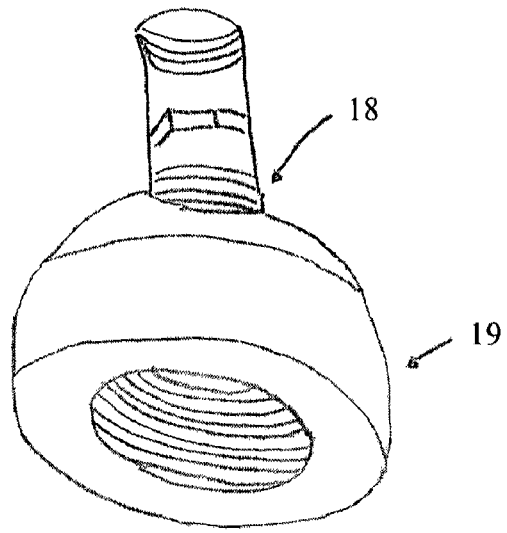
FIG. 23—Drawing of special fitting which has the Hex Head Coupling.
Figure 24:
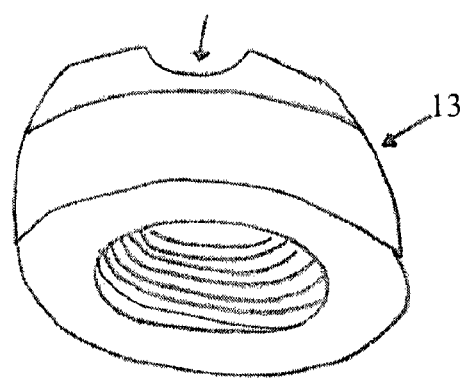
FIG. 24—Drawing of a plug with a drill hole in the center of the tool.
Figure 25:
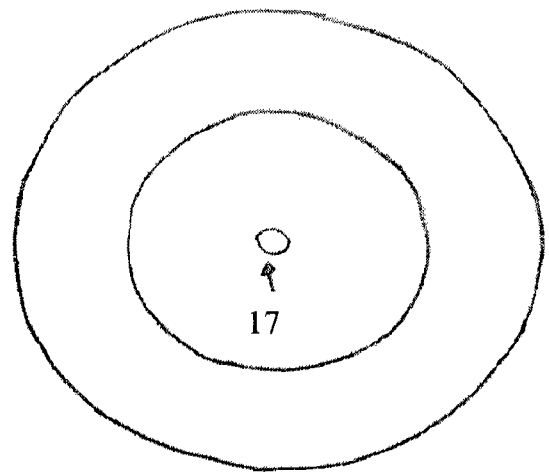
FIG. 25—Drawing of a plug with a drill hole in the center of it.
Figure 26:
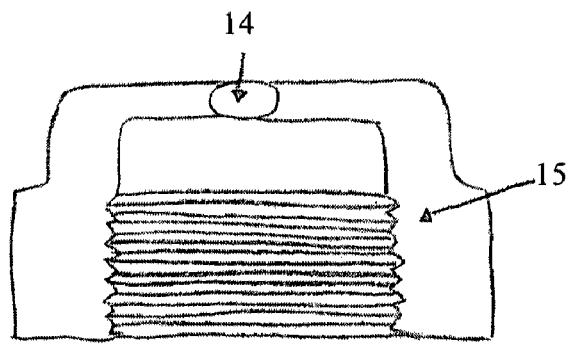
FIG. 26—Drawing of a plug with a drill hole in the center of it.

The invention claimed is:

1. An apparatus for testing of fluids pressure, said apparatus to be connected to kitchen and bathroom faucets at the aerator fitting, comprising: a one-piece main body having eight walls defining seven chambers, said walls having internal threads only at the end of each wall portions, said has two sets of combustion chambers, which are four of eight said chambers, being side inlets, all internally threaded at the end of each wall portions, whereby said one main body can be receptive to numerous different size pipes, fittings and adapters, being screwed separately into said one main body, two of four said chambers are upper side inlets ports, a first set of combustion chambers being straight flow chambers with a reduced special combustion chamber in the middle of said upper left and right side inlets ports, connecting the left and right ports, further comprising a second set combustion chambers being two side left and right bottom chambers, all of said four combustion chamber being ½ inch in diameter internally threaded only at the end of each wall portions and are side inlet chambers, wherein two of eight said chambers are internally threaded only on the end of the wall portions, said chambers are bottom inlet chambers being ⅛ inch in diameter, further comprising, one of eight said chambers are internally threaded at the end of the wall portion, said chamber is front face inlet chambers being ¼ inch in diameter, whereby a gauge can be installed into said one-piece main body, one-piece main body having a front face portion connected with said tubular walls of said first set of combustion chambers; said face portion having a gauge port in fluid communication with second set of combustion chambers; said front face portion having said upper left and right side inlet ports in fluid communication with said second set of combustion chambers, further comprising, two ⅛ inch plugs, and four ½ inch plugs being engaged in said first and second set of combustion chambers.

2. A testing apparatus as set forth in claim 1, further comprising one gauge, four ½" plugs and two ⅛" plugs being capable of being installed in said left and right side ports, wherein said first and second set of combustion chambers are being engaged in said upper left and right side inlet ports.

3. A method for testing pressure of fluids within an apparatus comprising the steps of: providing an aerator fitting, providing a one-piece main body having eight walls defining seven chambers, said walls having internal threads only at the end of each wall portions, providing two sets of combustion chambers, which are four of eight said chambers, being side inlets, all internally threaded at the end of each wall portions, whereby said one main body can be receptive to numerous different size pipes, fittings and adapters, being screwed separately into said one main body, manipulating adapters and fittings changing a diameter on the end of each side chambers, upper or lower externally for more readily accessible connections for testing in the fluid-tight manner, two of four said chambers are upper side inlets ports, providing a first set of combustion chambers being straight flow chambers with a reduced special combustion chamber in the middle of said upper left and right side inlets ports, connecting the left and right ports, providing a second set of combustion chambers being two side left and right bottom chambers which allows fluids from the top chambers to run into the bottom chambers and bounce hack out with more force then before, all of said four combustion chambers being ½ inch in diameter internally threaded only at the end of each wall, wherein two of eight said chambers are internally threaded only on the end of said wall portions, said chambers are bottom inlet chambers being ⅛ inch in diameter, further comprising one of eight said chambers are internally threaded at the end of said wall portions, said chamber is a front face inlet chambers being ¼ inch in diameter, installing a gauge into said one-piece main body, said one-piece main body having a front face portion connecting with tubular walls of said first set of combustion chambers; said front face portion having a gauge port in fluid communication with said second set of combustion chambers; further comprising, ⅛ inch plugs, and four ½ inch plugs in said upper left and right side inlet ports and engaging said first and second sets of combustion chambers in fluid communication with said upper left and right side inlet ports functioning with said one-piece main body.

4. A method of testing pressure of fluids according to claim 3 further comprising using said apparatus for kitchen and bathroom faucets, heating, stethoscope, ventilation and air conditioning systems, water meter, water softener machines, filtration units, vending machines, refrigerators, ice makers, washing machines, dishwashers, PVC or cast iron stacks, heating pack machine used in medical applications, both gas and water lines of hot water heaters, vending machines that make hot drinks, automobile transmission and air conditioner lines, wells, and any other area with adapters.

* * * * *